(12) United States Patent
Asseh et al.

(10) Patent No.: US 7,139,485 B2
(45) Date of Patent: *Nov. 21, 2006

(54) CHANNEL BALANCING OF A WAVELENGTH DIVISION MULTIPLEXED OPTICAL SIGNAL

(75) Inventors: Adel Asseh, Stockholm (SE); Simon Sandgren, Stockholm (SE); Anders Henriksson, Hässelby (SE); Mikael Bergman, Järfälla (SE); Raoul Stubbe, Stocksund (SE); Bengt Sahlgren, Saltsjö-Boo (SE); Ulf Öhlander, Hässelby (SE)

(73) Assignee: Proximion Fiber Systems AB, Kista (SE)

( * ) Notice: Subject to any disclaimer, the term of this patent is extended or adjusted under 35 U.S.C. 154(b) by 1313 days.

This patent is subject to a terminal disclaimer.

(21) Appl. No.: 09/749,395

(22) Filed: Dec. 28, 2000

(65) Prior Publication Data

US 2006/0120721 A1    Jun. 8, 2006

(51) Int. Cl.
*H04B 10/00* (2006.01)
*H04J 14/02* (2006.01)

(52) U.S. Cl. .............................. 398/84; 398/79; 398/87; 398/37

(58) Field of Classification Search ................... 385/37, 385/124, 11, 12, 15, 16, 25–38; 398/79, 398/84, 82, 87, 94
See application file for complete search history.

(56) References Cited

U.S. PATENT DOCUMENTS 4,466,694 A * 8/1984 MacDonald ................. 385/37

5,307,437 A *  4/1994  Facq et al. .................. 385/124
6,134,034 A    10/2000  Terahara
6,501,879 B1 * 12/2002  Asseh et al. .................. 385/37
6,665,459 B1 * 12/2003  Cush et al. .................... 385/15

OTHER PUBLICATIONS

Narrow-Band Resonant Optical Reflectors and Resonant Optical Transformers for Laser Stabilization and Wavelength Division Mutiplexing, Sep. 1987, pp. 1419-1425.
A Narrow-Band $Si_3N_4$-$SiO_2$ Resonant Optical Reflector, Sep. 1987, pp. 1426-1428.

* cited by examiner

*Primary Examiner*—Jason Chan
*Assistant Examiner*—Agustin Bello
(74) *Attorney, Agent, or Firm*—Birch, Stewart, Kolasch, & Birch, LLP

(57) ABSTRACT

The invention relates to methods and arrangements for channel balancing of a wavelength division multiplexed optical signal. Channel balancing according to the invention is performed by using a resonator that provides a selection region in which a selected channel has a substantially increased poser density relative to channels out of resonance. The selected channel is attenuated a desired amount, i.e. a desired amount of power is removed therefrom, by adjusting the properties of the selection region. In a preferred embodiment, attenuation is achieved by adjusting the selection region such that destructive interference is obtained for the selected channel in a fiber carrying tile multiplexed optical signal.

42 Claims, 8 Drawing Sheets

CHANNEL BALANCING OF A WAVELENGTH DIVISION MULTIPLEXED OPTICAL SIGNAL

TECHNICAL FIELD OF THE INVENTION

The present invention relates to channel balancing in optical wavelength division multiplexed (WDM) systems or dense WDM systems (DWDM). More particularly, the present invention relates to methods and apparatus for controlling the power levels of individual wavelength channels within a WDM or a DWDM signal.

TECHNICAL BACKGROUND AND RELATED ART

In order to increase the transmission capacity of optical fibre networks and communication links, wavelength division multiplexing techniques are often utilised. In WDM systems, a plurality of wavelength channels are transmitted through a single optical fibre (or possibly, other waveguiding means). Due to the nature of light, cross-talk between different wavelength channels is negligible and very high transmission rates can be achieved.

Although current optical fibres exhibit extremely low losses, optical repeaters are needed if transmission is carried out over long-haul transmission lines. Such optical repeaters typically comprise fibre amplifiers for amplifying the optical signal propagated by the fibre. The amplification in the amplifiers is normally slightly different for different Wavelengths, i.e. for different channels within the WDM signal. Moreover, different wavelengths may experience different losses along the optical network. Therefore, the relation between the power levels of the individual channels is not preserved throughout the network.

It is often desirable to maintain a constant power distribution between the channels, or to maintain a constant signal-to-noise ratio between the channels. In other cases, it can be desirable to maintain a certain power profile between the different wavelength channels in a WDM signal. To achieve this, it is necessary to introduce "gain equalisation", also known as channel balancing. A small variation between the channel powers at the transmitter can cause large variation between the channel powers at the other end. In general, the power levels of the different channels will change unpredictably as the signal propagates through the optical network. To overcome this problem, different approaches have been proposed.

A first suggestion was to utilise pre-ecualisation of the channels. Pre-equalisation is a method where the WDM signal is conditioned prior to transmission through the network. Compensation is then introduced at the transmitter in order to allots for upcoming channel-specific losses in the network. However, this method has some serious drawbacks. The amount of pre-equalisation possible is limited and may not be enough for the intended purposes. Furthermore, there has to be communication back to the transmitter from the receiver. In particular, this approach is only feasible in point-to-point connections where the routing through the network is the same for every channel in the WDM signal.

To improve the channel balancing, it was proposed to equalise the channels at every amplifier stage. This could be done by demultiplexing the channels after each amplifier stage, then attenuating each channel separately, and subsequently multiplexing the channels back together for further transmission through the network. However, this approach required a very complex structure of hardware, and added tolerance penalties in the demultiplexing/multiplexing stages. For these reasons, this approach was not feasible for commercial use.

Alternatively, a multi-channel filter could be used. One example of such filter is an acousto-optic tuneable filter (AOTF). An AOTF uses an RF signal to attenuate each channel independently of the others. However, the AOTF requires high amounts of driving power to balance more than a few (2–4) channels, and there is an increased tendency to cross-talk between the channels due to the acousto-optic filtering. Consequently, the use of an AOTF is not feasible when trying to equalise a large number or channels in a DWDM signal.

Another method is to use carefully designed passband filters to equalise the channels. Since this method is not tuneable, it is of minor importance in high-performance optical networks. Furthermore, fixed filters are believed to cause difficulties when used in connection with dynamic routing of channels, in which case it is not known in advance which way a certain channel will travel through the network.

A recent effort towards channel balancing is disclosed in U.S. Pat. No. 5,134,034. In that case, feedback from a receiver to a transmitter controls the power levels of individual channels before multiplexing the channels together. In essence, this is just pre-equalisation. As mentioned above, serious problems are connected with such an approach. Firstly, the method is only feasible for point-to-point, connections. If the network is constituted by a mesh, in which the channels can take any route, the principle does not apply. Secondly, and as mentioned above, pre-equalisation is sometimes not enough. This is particularly obvious when it is not known at the transmitter which route each channel will take through the network.

Consequently, there is a need for new methods and apparatus for channel balancing that can allow any routing through the network, that can be located at any point in the network, and that dynamically equalise the power levels between channels according to any desired scheme.

SUMMARY OF THE INVENTION

A general object of the present invention is to provide channel balancing in WDM or DWDM optical systems that eliminates or at least alleviates the problems associated with the prior art. This general object is achieved by methods, couplers and arrangements according to the appended claims.

Moreover, the present invention provides other features and advantages that will become apparent when the following detailed description of some preferred embodiments is read and understood.

Accordingly, the present invention provides a method, and an arrangement for performing the method, for channel balancing of a wavelength division multiplexed (WDM) optical signal, the method including the steps of identifying at least one channel, within said optical signal, having higher than a desired power level; establishing a resonance to said channel, the resonance providing a selection region where said channel has a substantially increased power density relative to other channels in the optical signal; and attenuating said optical signal by manipulating the selection region, the attenuation thereby being negligible for any channel out of resonance but pronounced for the resonant channel.

Hence, the channel balancing is performed directly upon the multiplexed optical signal without any actual demultiplexing, in a conventional context, of the same. Instead, one channel is singled-out in a selection region while other channels may remain multiplexed in the optical signal. Light from the selection region is fed into the multiplexed optical signal, and by adjusting the properties of the selection region, it is possible to apply desired effects on the channel. For example, the channel that is singled-out by the selection region can easily be attenuated virtually without affecting other channels within the optical signal.

The present invention is based on a deep insight into resonantly enhanced channel separation in the optical domain, and into the characteristics of Bragg gratings and how such grating work when provided in connection with a waveguiding structure. When a resonator is operatively connected to a waveguiding structure such as an optical fibre, a set of wavelength intervals will start to resonate in said resonator. Consequently, a high power level will build up inside the resonator, effectively filtering out the resonant wavelength(s). If attenuation is applied to a carefully selected portion of a waveguiding structure, comprising resonantly enhanced channel separation, attenuation will be provided predominantly to desired channels.

Channel balancing includes adjustment of the power level of one wavelength channel to a desired value. Thus, each channel within the WDM optical signal has an associated desired value. The desired value could be equal for all channels, in which case the channel balancing causes the power level of all channels to be equal. In other cases, the desired value could be set according to some predefined profile. Such profile, for example, could compensate for known losses in a transmission system before sending the optical signal (pre-equalisation of channels). The desired value could also be such that each channel exhibits the same signal-to-noise ratio, i.e. channels for which more noise is expected in the system are given a higher power level than those for which less noise is expected. Noise is introduced by, for example, amplifiers in the transmission system (such as amplified spontaneous emission in fibre amplifiers). Generally, the desired values could be set according to any input, including user input by means of a control console, the invention not being limited to any particular method for establishing the desired values.

In one aspect, the present invention provides a method for channel balancing of a WDM optical signal, by which method single wavelength channels can be attenuated separately. Channel separation according to the invention is achieved by providing a resonator that is resonant to at least one wavelength channel within said optical signal. The resonator establishes a region where the resonant channel has a substantially increased power density with respect to non-resonant wavelength channels. According to the invention, attenuation is provided in said region of increased power density. Attenuation is thus predominantly applied to the resonant channel, although the attenuation means per se might be non-discriminating in terms of wavelength.

In another aspect, the present invention provides an arrangement for channel balancing of a WDM optical signal. The arrangement comprises a spectrum analyser for analysing the power spectrum of the optical signal, and an attenuator for attenuating single wavelength channels within said optical signal. The arrangement further comprises a resonator that is resonant to at least one specific wavelength channel within the optical signal, and provides a selection region where a selected signal has a substantially increased power density in relation to channels out of resonance. Furthermore, the attenuator is arranged to attenuate said optical signal by acting upon or by adjusting the properties of the selection region. Thus, by providing a region where one channel within the optical signal is predominant, channel specific attenuation can be attained by using attenuation means that are essentially non-discriminating in terms of wavelength.

In another aspect, the present invention provides dynamic optical filters, or couplers, that can be arranged in cascade. The present invention provides optical filters that are both controllable in attenuation and tuneable in wavelength. One advantage of the present invention is that a plurality of filters can be tuned to approximately the same wavelength. By tuning more than one filter to wavelengths close to a selected wavelength channel, it is possible to shape the filtering. In other words, by superimposing the effects of a plurality of filters, the transmission of the filter can be tailored to a desired profile. For example, the transmission curve of the filter can be flattened or broadened by allowing multiple filters to act on the same wavelength channel. In this way, a super dynamic capability can be achieved, further increasing the versatility of the channel balancing according to the present invention. Preferably, in order to achieve this super dynamic capability, a set of sub-resonators are associated with a common channel within the WDM signal.

In one embodiment, properties of the selection region are adjusted in order to change the phase of light in the selection region. By directing part of the power of the selected channel into the selection region, and leaving part of the channel in the optical signal, a phase change of the light in the selection region can cause destructive interference of the channel when it is fed back into the multiplexed signal. Consequently, the selected channel can be removed from the multiplexed optical signal by destructive interference. In fact, the destructive interference can be arbitrarily tuned by properly adjusting the phase of the singled-out portion, thereby allowing attenuation or the channel to any chosen degree. When attenuation is effected by means of destructive interference as described above, light is instead forced out of the selection region by making it impossible for the light to continue to propagate in the multiplexed optical signal.

Thus, according to one embodiment of the present invention, attenuation of one channel is achieved by dividing the power of said channel in two portions, and then adjusting the phase of one of said portions so that when the two portions are brought back together, destructive interference occurs in the propagation direction of the optical signal. More particularly, an arrangement for attenuation by destructive interference comprises a waveguiding structure, preferably an optical fibre, into which the wavelength division multiplexed optical signal is directed. In said fibre, there is provided a deflector arranged to deflect light into an external resonator, said deflector preferably comprising a blazed, or tilted, phase grating. The external resonator can be tuneable in order to allows tuning of the wavelength to which said resonator is resonant. The deflector is weak, in that it only deflects a small fraction of light impinging thereupon. However, a strong field will quickly build tip inside the resonator at the wavelength interval (or intervals) to which the resonator is resonant and thereby establish a selection region in which the power density of the resonant wavelength is considerably higher than of other wavelengths. Thus, at equilibrium, higher power will be reflected back and forth between the mirrors inside the external resonator, and the power deflected into the resonator from the fibre will be equal to the power deflected out from the resonator back into the optical fibre. By adjusting the phase of the light inside the external resonator, destructive interference between light from the resonator and light remaining in the fibre can be obtained in a selected propagation direction. Hence, by tuning the external resonator, it is possible to prevent light of the resonant Wavelength from propagating in a selected direction in the fibre. Likewise, it is possible to achieve fractional destructive interference, and thereby prevent only a fraction of the resonant wavelength from propagating in a selected direction. In this way, tuneable attenuation of the channel cower is attained. The features of this embodiment will be fully understood when the detailed description below is read.

In another embodiment, similar to the one described above, the external resonator is constantly tuned (or fixed) to provide constructive interference. According to this embodiment, attenuation is achieved by introducing a loss in the external resonator. Consequently, when the two portions of the channel are brought back together, the resulting power is lower than the power before dividing the channel. Typically, it is possible to achieve up to about 50 percent attenuation with this embodiment.

According to yet another embodiment of the present invention, the external resonator encloses two optical fibres. The selection region provided by said resonator is then responsible for the coupling of the resonant wavelength between said two fibres. The coupling factor between the two fibres can be tuned by adjusting the properties of the external resonator, and thereby provide tuneable attenuation of the selected channel at the coupling between the two fibres. Alternatively, a variable loss can be introduced into the external resonator.

Other embodiments of the present invention rely on an internal resonator, rather than the external resonator described above. The internal resonator is preferably co-linear with the propagation direction of the waveguiding structure. Such internal resonator is provided by arranging at least one Bragg grating in the waveguiding structure. Preferably, said grating is a chirped Bragg grating being resonant to different wavelengths at different positions along the same. A controllable amount of power can easily be removed from one channel of the wavelength division multiplexed optical signal at the position of the corresponding resonance. Wavelength selective coupling assisted by a chirped Bragg grating is described in the co-pending application "Optical Coupling" (U.S. application Ser. No. 09/608,218), which is hereby incorporated by reference.

According to the present invention, the internal resonance provides a selection region in which attenuation can be obtained by introducing, for example, a loss. The loss can be of simple nature, for example a micro-bend of the fibre, said micro-bend causing light to leak out of the optical fibre. Since the power density or a selected channel in the selection region is substantially higher than the poster density of other channels, the loss predominantly affects the selected channel. Another feasible approach to achieve tuneable loss is to utilise evanescent coupling of light from the selection region. By controlling the distance between a probe and the waveguiding structure, the power coupled out from the waveguiding structure can be controlled. Yet another method of inducing a loss is to utilise controllable liquid crystals, in which the transmittance can be arbitrarily varied.

Preferably, the properties of the selection region are adjusted so that the selected channel is unaffected in default setting. Furthermore, and since all channels except for the selected channel are unaffected by the selection region, any number of arrangements can be introduced in cascade in a communications network. Channel balancing according to the present invention is thus inherently cascadeable.

Furthermore, no feedback to the sender (the transmitter) is needed although pre-equalising is certainly possible within the scope of the present invention.

It is important to understand that the term channel balancing does not imply that the poorer level of all channels should be made equal conversely, the power levels of the channels could be adjusted to any desired value. Thus, the present invention provides channel selective power control, thereby allowing control of the power distribution between channels in a WDM or DWDM optical signal.

It is to be understood that all the embodiments or the present invention are inherently serial, in that any number of resonators (or selection regions) can be arranged in cascade. Thus, there is no limitation on the number of channels that can be balanced (i.e. individually attenuated).

BRIEF DESCRIPTION OF THE DRAWINGS

In the following, a number of preferred embodiments of the present invention will be described in detail. The description below is more easily understood when read in conjunction with the drawings, in which FIG. 1 schematically shows an arrangement according to the present invention comprising external resonators.

Throughout the drawings, like parts are designated by like references.

DETAILED DESCRIPTION OF PREFERRED EMBODIMENTS

Figure 1:
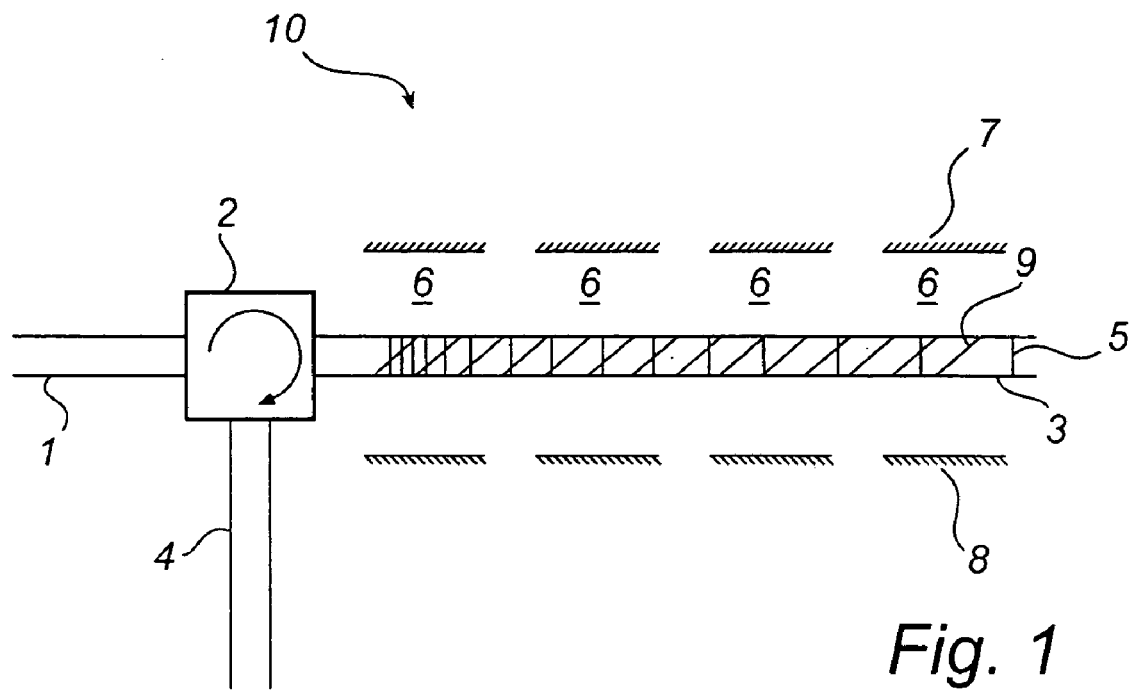

A first preferred embodiment of an arrangement according to the present invention is schematically shown in FIG. 1. The arrangement shown is to be regarded as the best mode of carrying out the invention, based on current knowledge.

FIG. 1 shows a channel balancing arrangement 10 having an input fibre 1 that is connected to an optical circulator 2. The circulator 2 is arranged to direct light coming from the input fibre 1 into an intermediate fibre 3, and to direct light coming from the intermediate fibre 3 into an output fibre 1.

Channel balancing according to the present invention is accomplished in the intermediate fibre 3. The fibres 1, 3 and 4 are all capable of carrying a wavelength division multiplexed optical signal.

The intermediate fibre 3 comprises a chirped Bragg grating 5 (shown in the figures as vertical bars with increasing separation), which reflects all light within a predefined wavelength range back towards the circulator 2. The chirped grating 5 acts as a distributed back-reflector for light entering the intermediate fibre 3; different wavelengths arc back-reflected at different positions of the chirped grating 5. Hence, if the intermediate fibre 3 is inactive, the optical signal will continue down the communications link on the output fibre 4 much as if the intermediate fibre 3 and the circulator 2 was not there.

However, at the intermediate fibre 3, there is arranged a plurality of external resonators 6, each of which is defined by a first 7 and a second 8 mirror arranged outside and on opposite sides of the fibre 3. Furthermore, each external resonator 6 is coupled to the intermediate fibre 1 by a respective deflector 9. The deflectors 9 are preferably comprised of tilted, i.e. blazed, Bragg gratings that are superimposed on the chirped Bragg grating 5 in the intermediate fibre 3, and arranged to deflect light from the fibre 3 and into the respective external resonator 6, and to deflect light from each respective external resonator 6 into the fibre 3.

The deflecting power of the deflectors 9 can be very low, only a very small fraction of light in the fibre 3 being deflected into each external resonator 6. However, the chirped grating in the fibre governs, in the region where each wavelength is reflected, the accumulation of power for that wavelength. Thus, the deflected power of any one wavelength can be enhanced by providing the deflector in the region where said wavelength is reflected by the chirped Bragg grating. At equilibrium, the coupling of light to and from the resonator will be equal. The power of the resonant wavelength will be significantly increased inside the resonator, and will be coupled back into the intermediate fibre by the associated deflector. Note that since light is reflected back and forth in the resonators, the deflector (i.e. the tilted Bragg grating) will couple light back into the fibre in both propagation directions. By making the refractive index modulation of the chirped grating 5 sufficiently large, a second resonance can be obtained in the chirped grating 5, which resonance further increases the coupling of power of the resonant wavelength. The mechanism behind the resonantly enhanced coupling in connection with a chirped Bragg grating is comprehensively described in the aforementioned co-pending application "Optical Coupling" (U.S. application Ser. No. 09/108,218).

The part of the optical signal not entering any external cavity 6 will, as indicated above, be back-reflected by the chirped grating 5. At each deflector 9, the back-reflected light of one wavelength will interfere with light coupled out of the respective external resonator 6. By adjusting the external resonator, preferably by a parallel displacement of the two mirrors 7 and 8 with respect to the fibre 3, destructive interference can be achieved such that no light of the resonant wavelength can return to the optical circulator 2. Alternatively, destructive interference can be achieved by altering the optical path length of the external resonator by changing the refractive index in at least some portion thereof. Consequently, the corresponding wavelength channel is eliminated from the multiplexed optical signal. When light of one channel is prohibited to return to the circulator 2 in this way, light energy is instead forced to leave the system elsewhere, for example through the chirped grating 5 or through either of the resonator mirrors 7, 8.

It is to be understood that different levels of destructive interference can be obtained by adjusting the external resonators. This means that each channel can be fully blocked or fully passed, as well as partly blocked to any desired degree.

Hence, the external resonators provide selection regions where corresponding channels are singled-out from the multiplexed optical signal. Leach of the external resonators 6 is individually adjustable so that, by cascading such resonators, attenuation can be effected simultaneously on any number of channels.

Tile arrangement shown in FIG. 1 is provided in an optical communications link, in which a WDM signal or a DWDM signal is propagated. The optical signal enters the optical circulator 2 from the input fibre 1; and is directed into the intermediate fibre 3 where the channel balancing is performed. From the intermediate fibre 3, light is directed into the output fibre 4 by the optical circulator 2 for further transmission down the communications link. Thus, the arrangement 10 is design a to be connected anywhere in an existing optical network.

An external resonator can also be tuned to be resonant to any wavelength within the tuning range by changing the separation between the first 7 and the second 8 mirror, or by tilting the external cavity 6 in its entirety with respect to the fibre 3. In this way, more than one resonator can be made resonant to almost the same wavelength. Consequently, one channel within the multiplexed optical signal can be filtered (attenuated) by more than one selection region. This feature gives the arrangement according to the invention great versatility and provides a "super dynamic" capability, i.e. the capability of shaping the filter function. This super dynamic capability will be further described with reference to FIG. 2.

Figure 3:
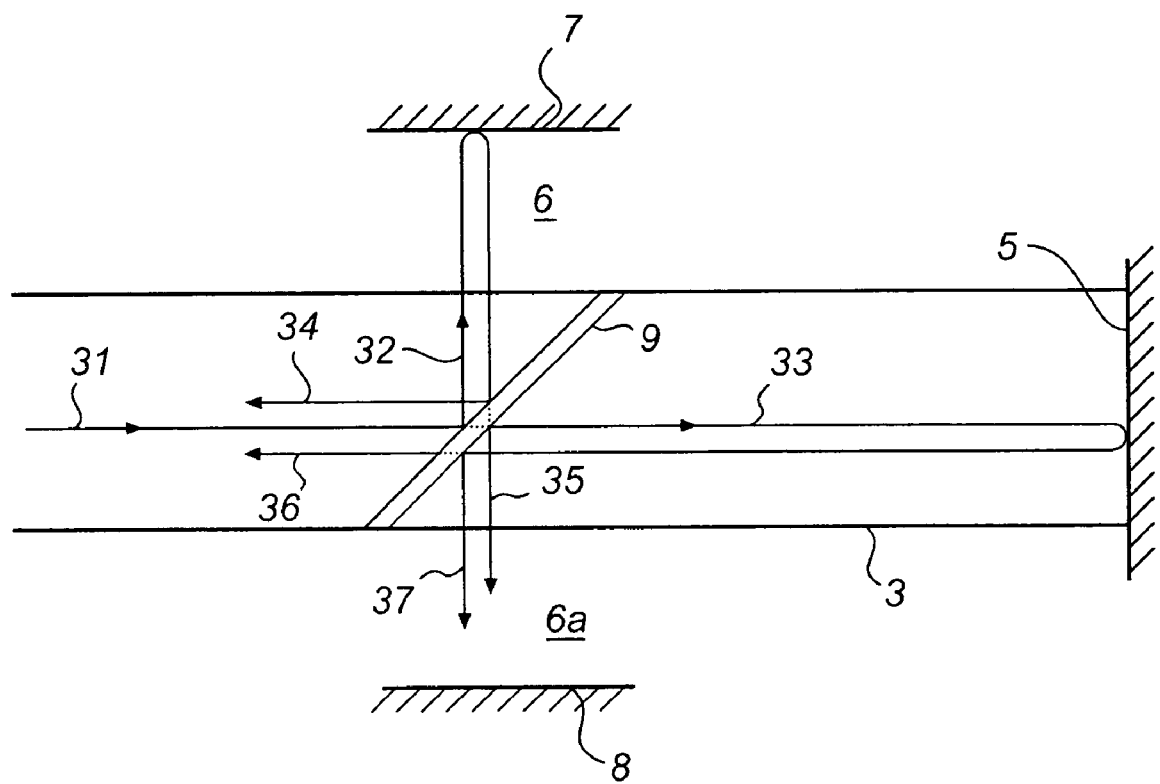
FIG. 3 schematically shows a magnified picture of an arrangement according to the present invention.

The variable attenuation by destructive interference will now be described in greater detail with reference to FIG. 3. FIG. 3 is a schematic magnified picture of one external resonator 6 and its associated deflector 9. Also shown in the figure is the back-reflecting grating 5, now shown as a plane mirror in the waveguiding structure 3. The blazed grating, constituting the deflector 9, is shown as a single domain between the resonator mirrors. The above simplifications are for the purposes of graphical clarity only.

Light (the optical signal) is sent into the arrangement from the left in the figure, as indicated by the reference numeral 31. When impinging upon the deflector 9, some of the light is deflected towards the upper resonator mirror (as indicated by 32), and some light is transmitted towards the back-reflector (as indicated by 33). Light deflected towards the upper resonator mirror 32 is reflected back towards the deflector and, again, some light is reflected back to the left (as indicated by 34) in the figure (counter-propagating to the incoming light) and some light is transmitted towards the lower resonator mirror (as indicated by 35). Light initially transmitted towards the back-reflector 33 will, at the back-reflector 5, be reflected back towards the deflector 9. At the deflector, some of this light is reflected towards the lower resonator mirror (as indicated by 37), and some of the light is transmitted back to the left (as indicated by 36) in the figure (countor-propagating to the incoming light).

Now, in the lower part of the external resonator 6a, two beams are superimposed; namely light from the back-reflector 37 and light from the upper resonator mirror 35. On the other hand, two beams are also superimposed in the waveguiding structure to the left of the deflector. For clarity only, the beams are shown with a small offset. By a parallel displacement of the external resonator 6 with respect to the waveguiding structure 3, or by changing the refractive index in at least some portion of the external resonator, destructive interference between the two superimposed beams can be obtained either in the lower part of the external resonator (beams 35 end 37), or in the waveguiding structure to the left of the deflector (beams 34 and 36). Consequently, if destructive interference is obtained in the waveguiding structure to the left of the deflector, all light is forced into the external resonator 6. The channel at issue is thus blocked from returning to the circulator 2 (not shown in FIG. 3). On the other hand, if destructive interference is obtained in the lower part of the external resonator 6a, light is actually prevented from entering the external resonator 6 at all, and hence all light is transmitted hack towards the circulator 2. The channel at issue is thus unaffected and transmitted back to the circulator 2 in its entirety.

Figure 2:
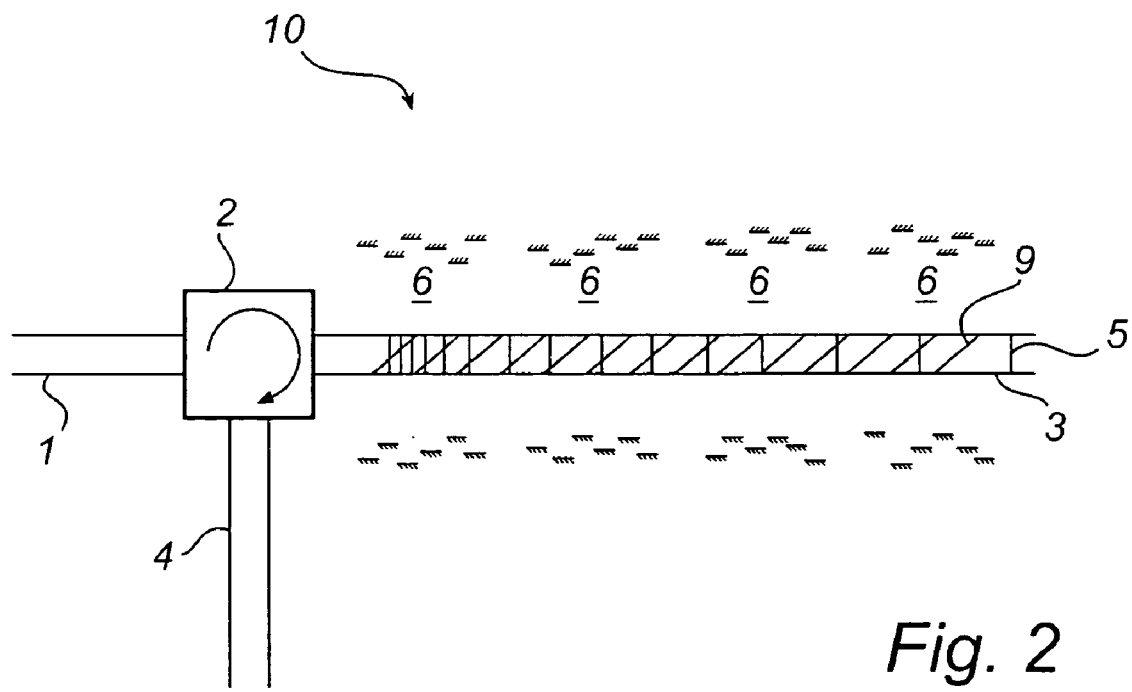
FIG. 2 schematically shows an arrangement according to the present invention having a super dynamic capability.

FIG. 2 shows schematically an arrangement according to the present invention having a super dynamic capability. Each of the external resonators 6, as compared to the arrangement shown in FIG. 1, is divided into six separate external sub-resonators. It is to be understood that any number of sub-resonators is conceivable, the shown embodiment of six sub-resonators being an example only. In this embodiment, a wavelength division multiplexed optical signal coming into the optical circulator 2 from the input fibre 1 is directed into the intermediate fibre 3. In the intermediate fibre 3, separate channels of the optical signal are attenuated individually, i.e. channel balancing is performed. When it comes back to the optical circulator 2 from the intermediate fibre 3, the optical signal is directed into the output fibre 4 for further transmission down the optical communications link.

In the intermediate fibre 3, there is provided a chirped Bragg grating 5, reflecting essentially all light within a predefined wavelength range. Thus, if the optical signal is not manipulated with in the intermediate fibre 3, the signal will return to the optical circulator 2 and be directed into the output fibre 4. At the intermediate Fibre 3, there is arranged a plurality of external resonators 6, each of which comprises a plurality of sub-resonators. In fact, a sub-resonator, is not different from any other external resonator, the expression sub-resonator being used only to points out that a plurality of resonators is coupled to, or associated with, a common channel within the optical signal. The external resonators 6 are coupled to the intermediate fibre 3 by deflectors superimposed on the chirped Bragg grating in the intermediate fibre. The deflectors are arranged to deflect light from the intermediate fibre 3 into the respective external resonator 6, and to deflect light from each external resonator 6 into the intermediate fibre 3.

The super dynamic capability of the arrangement shown in FIG. 2 is provided by the sub-resonators in each external resonator. As mentioned above, each external resonator is divided into a plurality of individual sub-resonators, each having its own phase and its own resonant wavelength. Each sub-resonator is defined by a pair of sub-mirrors, said sub-mirrors being individually controllable in order to callow tuning of the phase and the resonant wavelength of each sub-resonator individually. It is important to understand that when a plurality of external resonators is coupled to a common channel within the optical signal, these external resonators are named sub-resonators (to that particular channel). Consequently, the effects of all sub-resonators are superimposed on each other when the resonant channels are deflected back into the intermediate fibre.

Although it could be possible to achieve a super dynamic capability with distributed resonators, each having its own deflector, it is preferred that the super dynamic capability for each channel is provided by a plurality of sub-resonators arranged adjacent to each other, and coupled to a common channel within the WDM or DWDM optical signal. With such an arrangement, the chirped grating that enhances the coupling between the external resonators and the intermediate fibre can be utilised effectively.

Figure 6:
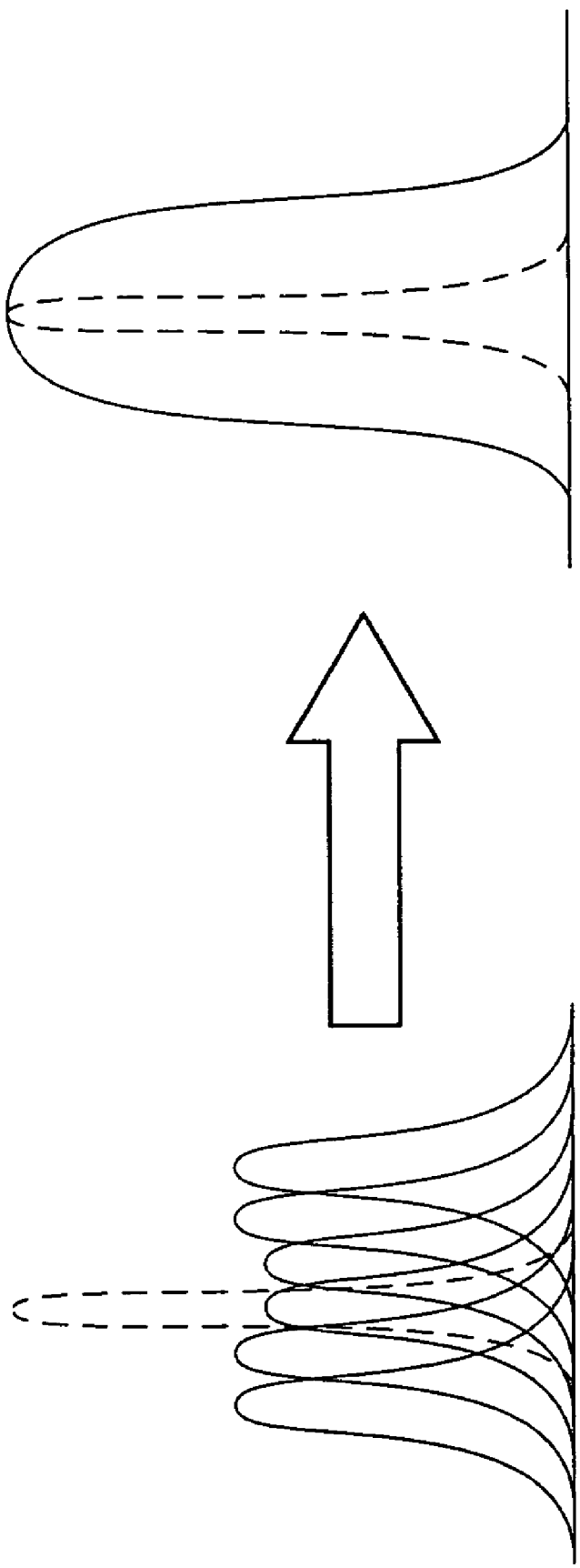
FIG. 6 schematically shows how a super dynamic filtering capability is achieved.

As illustrated in FIG. 6, each sub-resonator is adjusted to a different resonant wavelength and adjusted to provide a desired attenuation, thereby constituting, in fact, six different filters for the one and same channel. The superposition of these six filters provides the super dynamic capability of the arrangement shown in FIG. 2. By tuning the sub-resonators individually, the resulting filter function for a channel can be flattened broadened or modified. The filtering is therefore said to be super dynamic, and the arrangement exhibits a super dynamic capability.

Figure 4:
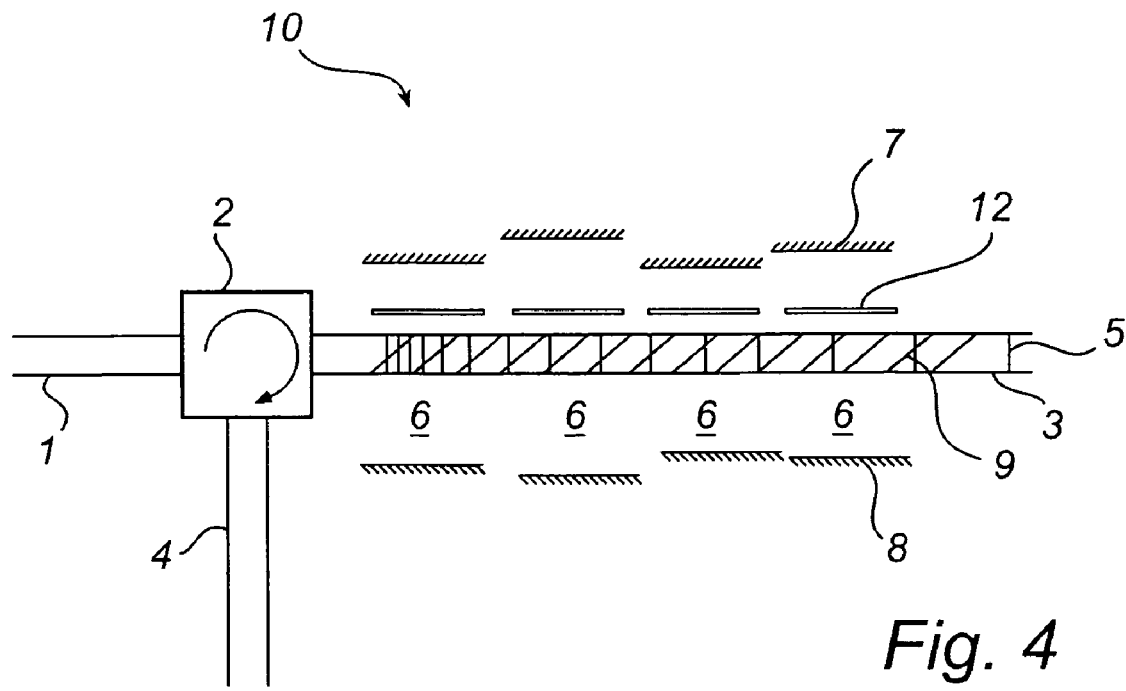
FIG. 4 schematically shows an arrangement according to the present invention comprising external resonators in which controllable absorbers are provided.

Referring now to FIG. 4, an embodiment related to that shown in FIG. 1 comprises controllable absorbers 12 or similar means inside the external resonators 6 in this case, the resonators need riot be tuneable themselves as long as they are adjusted to the proper wavelength. Rather, controllable attenuation is provided by said absorbers 12. This embodiment is somewhat simpler than the foregoing, in that it lacks some of the features of the arrangement above. However, in many cases this less elaborated arrangement may be preferred by virtue of its simplicity.

The external resonators of the embodiment shown in FIG. 4 are typically arranged to provide constructive interference between back-reflected light from the chirped grating and light coupled out from the resonators. Attenuation is achieved by changing the amplitude of the light from the resonators. In an exemplary situation, half of the channel power could be deflected into the external resonator and half of the power could be back-reflected by the chirped grating if no absorption takes place in the external resonator, the channel is not attenuated. On the other hand, if all light in the external resonator is absorbed, the channel power is halved. Thus, the embodiment of FIG. 4 could not, in the case indicated above, be used to eliminate a channel from the wavelength division multiplexed optical signal, but only to reduce the signal strength by half. However, in most practical applications, this is sufficient indeed.

Figure 5:
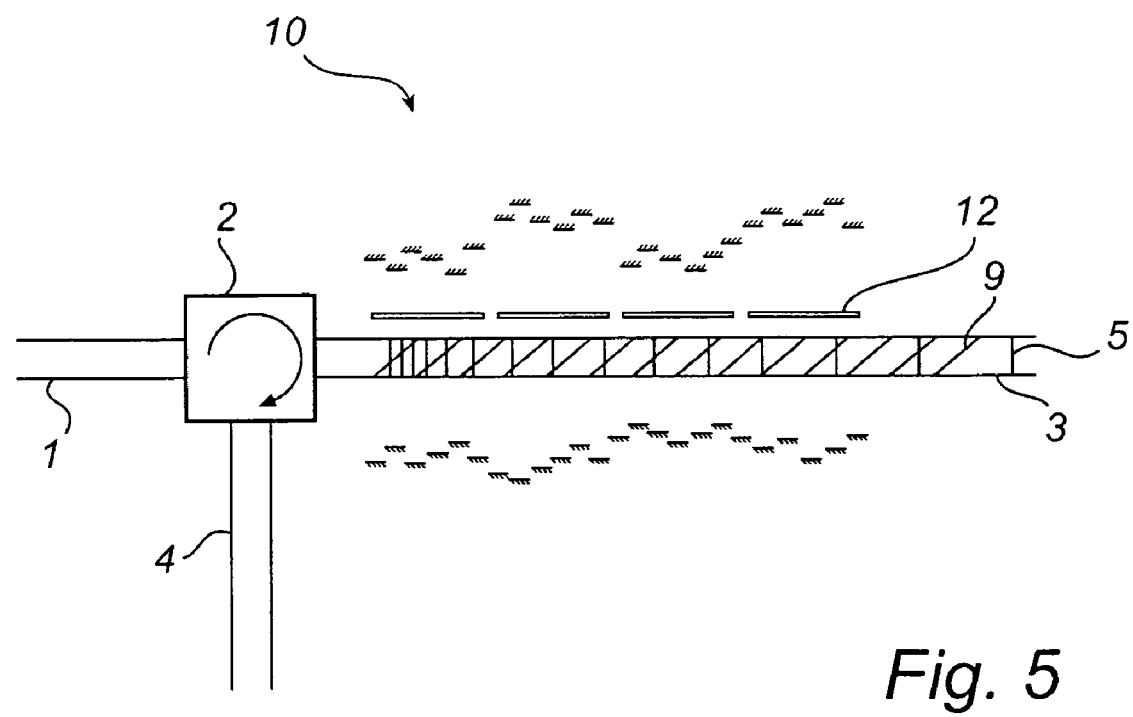
FIG. 5 schematically shows an arrangement according to the present invention comprising controllable absorbers and having a super dynamic capability.

The arrangement shown in FIG. 4 can be further extended to have super dynamic filtering capabilities, much alike the arrangement shown in FIG. 2, by using a plurality of external resonators as sub-resonators. An arrangement comprising external resonators arranged into sub-rosonators and comprising a controllable absorber for each channel (each set of sub-resonators) is shown in FIG. 5. Although it is certainly possible to allow individual tuneability by adjustably mounting the sub-mirrors defining the sub-resonators, it is preferred to have fixed sub-mirrors. When the sub-mirrors are fixed, each sub-resonator is resonant to a fixed wavelength. The arrangement is only tuned by adjusting the transmittance of the controllable absorbers inside the external resonators. Further versatility is achieved by providing a dedicated absorber for each sub-resonator. Preferably, the absorber comprises an array of controllable liquid crystal cells. The transmittance of each cell then defines the attenuation in each sub-resonator.

The advantageous feature of super dynamic capability of the present invention is summarised in FIG. 6. As illustrated, more than one resonator is tuned to be resonant to a wavelength close to a selected channel. The resonant wavelength interval of each resonator is slightly overlapping, thereby providing a superposition of the filter curves, as indicated to the left in the figure. The total effect of in this case four different filters is indicated to the right of the figure. By superimposing a plurality of filters in this way, the transmission curve (the filter curve) can be tailored to a desired profile (shaped, flattened or broadened). Thus, this capability is referred to as being super dynamic. Arrangements having this super dynamic capability are described above and are schematically shown in FIGS. 2 and 5.

Figure 7:
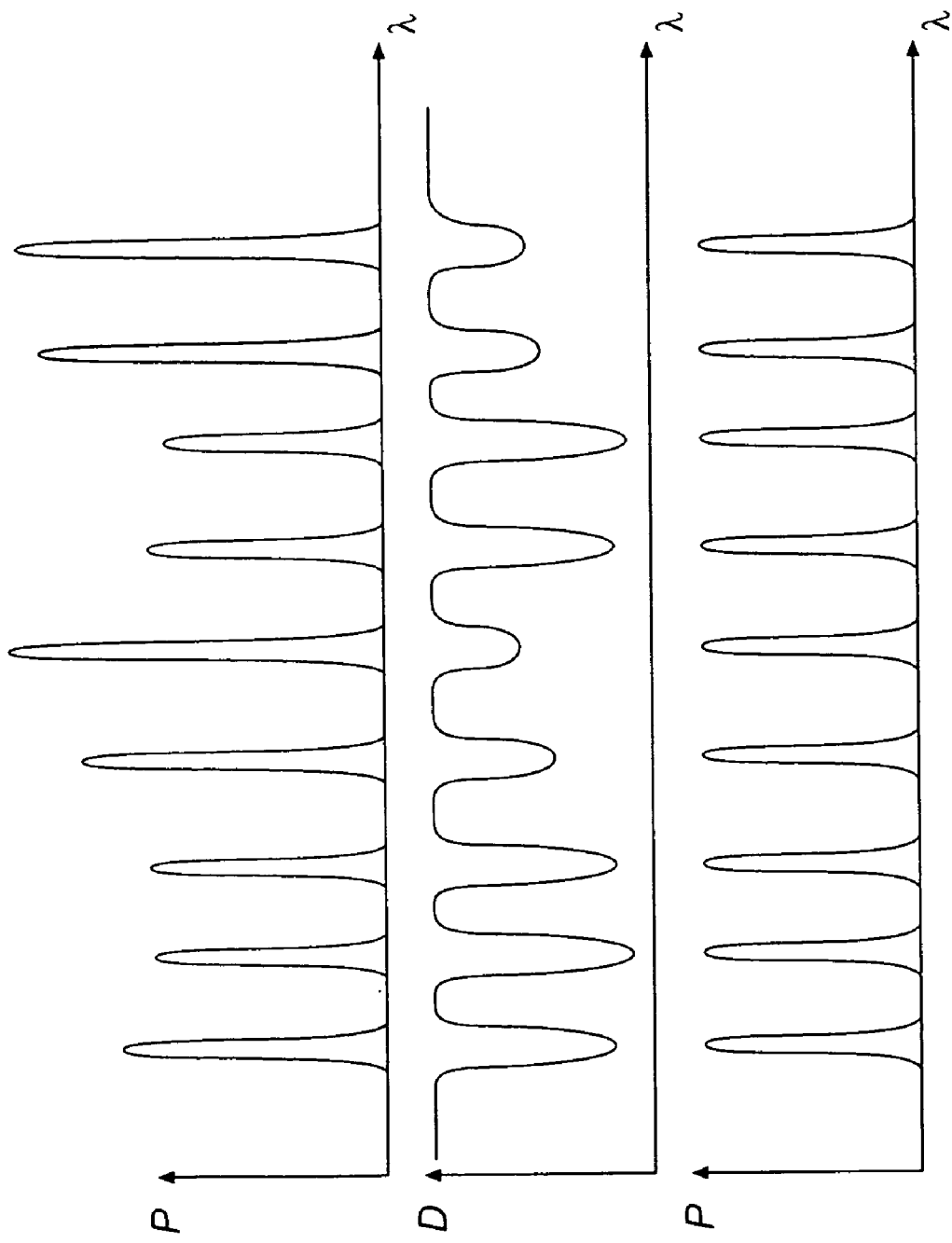
FIG. 7 schematically shows an input signal, a filter function and a filtered output signal.

FIG. 7 shows schematically how channel balancing is performed. A plurality of channels within a wavelength division multiplexed optical signal is propagated in an optical fibre. The different channels have different signal powers, as indicated in the uppermost diagram of FIG. 7. The optical signal is launched into an arrangement for channel balancing according to the present invention. In the illustrated case, all channels are selected for attenuation and the desired result is that all channels should have the same power level (signal strength). For each of the channels, a resonance is established that provides a respective selection region. Each selection region is then adjusted so that proper attenuation D is applied to each channel. In other words, transmission windows arc provided for each channel, as indicated in the centre diagram of FIG. 7. When the optical signal has passed through the transmission window (actually, when each channel has been attenuated by a desired amount), it is coupled into the transmission fibre carrying the signal (corresponding to the output fibre of the arrangement 10, Consequently, the optical signal has been subject to channel balancing, in which the strength of all channels has been equalised, as indicated in the lowermost diagram of FIG. 7.

By using other levels of attenuation for each channel, it is straightforward to achieve any power profile of the balanced signal.

Figure 8:
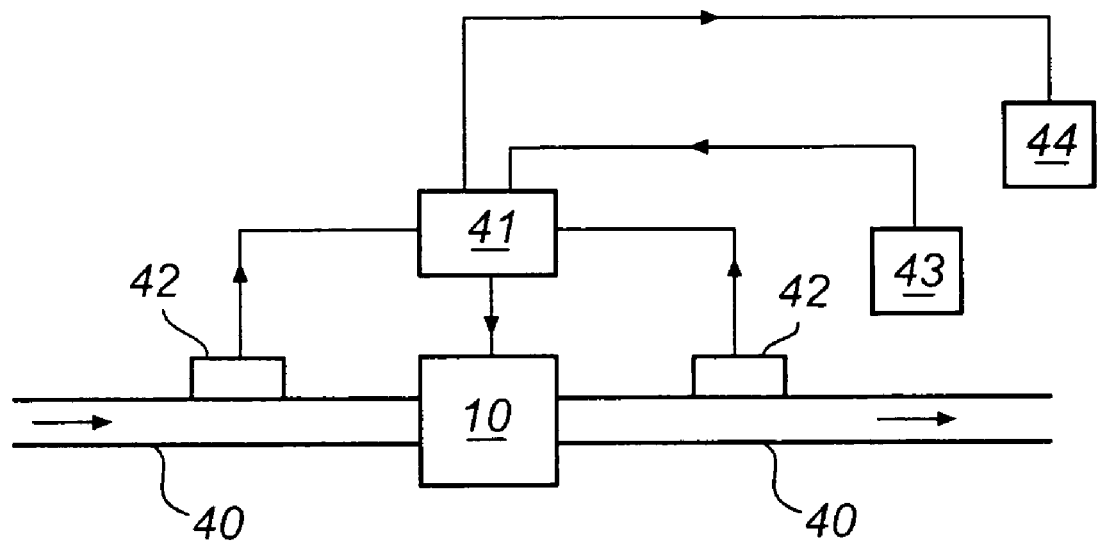
FIG. 8 schematically shows, in block form, a set-up for channel balancing of an optical signal propagating in a fibre.

FIG. 8 illustrates how channel balancing according to the present invention is implemented at an optical communications link. An attenuator arrangement 10 according to any one of the embodiments of the present invention is connected to an optical fibre 40 capable of carrying a wavelength division multiplexed optical signal. A controller 41 is operatively connected to the attenuating arrangement 10 in order to control the channel balancing. Downstream and/or upstream in the fibre 40 from the attenuating arrangement 10 there is provided a spectrum analyser 42. The spectrum analyser 42 is arranged to analyse the power spectrum of the optical signal propagating in the optical fibre 40. The measured power spectrum is sent to tile controller 41 and at least one channel within the optical signal having higher than a desired power level is identified and selected for attenuation. The controller 41 adjusts the attenuating arrangement 10 in order to provide the desired attenuation of the at least one selected channel.

Either of the spectrum analysers 42 can be omitted. If spectrum analysis is performed only upstream from the attenuating arrangement, the optical signal is analysed prior to being subjected to attenuation, and the desired channel balancing is performed at the attenuating arrangement in accordance with the measured power spectrum forwarded to the controller. If, on the other hand, spectrum analysis is performed only downstream from the attenuating arrangement, the optical signal is analysed after being subjected to attenuation, and the measured power spectrum is fed back to the controller in order to provide the required channel balancing.

However, it is sometimes preferred to analyse the power spectrum of the optical signal both upstream and downstream of the attenuating arrangement. In this case, the measurement of the power spectrum performed upstream from the attenuating arrangement is used to establish a desired attenuation, and the measurement performed downstream of the attenuating arrangement is used to check that the desired channel balancing was actually provided. It is to be understood that the spectrum analysis can be performed remote from the attenuating arrangement 10, i.e. from the place where the actual channel balancing is performed. Nevertheless, it is preferred that spectrum analysis is performed close to the channel balancing, in order to minimise the need for feedback and feedforward connections.

Furthermore, the controller 41 is preferably operatively connected to input 43 and output 44 devices, such as a keyboard, a peripheral monitoring and surveillance system, a display screen, etc., in order to allow automated or operator assisted control of the channel balancing. For example, it may be desired to reconfigure the controller 41 in order to provide channel balancing according to a new scheme. At one instant it may be preferred to achieve a uniform signal-to-noise ratio of the channels in the optical signal; at some other instant it may he preferred to achieve a uniform power distribution; and at yet another instant it may be preferred to achieve a certain power profile.

Figure 9:
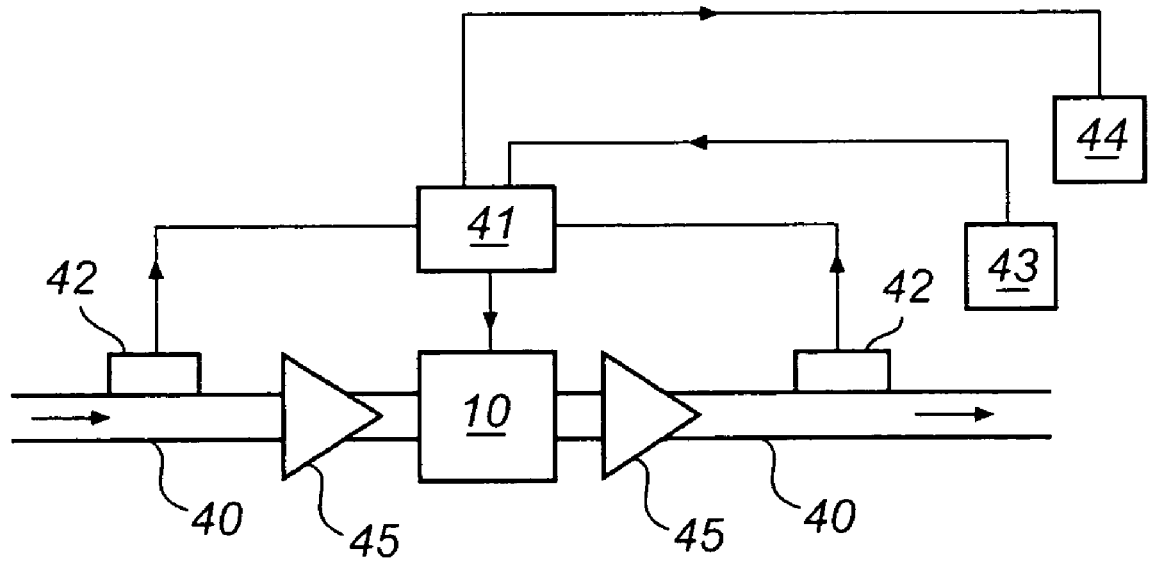
FIG. 9 schematically shows, in block form, a set-up for channel balancing, including a pre-amplifier and a power-amplifier for amplifying the optical signal.

FIG. 9 shows schematically an extended implementation of the arrangement for channel balancing, including a pre amplifier 45 upstream from the attenuator 10, and a power amplifier 46 downstream from the attenuator 10. Such configuration is often preferred in order to achieve a high enough power level of the channels. The amplifiers 45, 46 can have a predefined gain, but it is also conceivable to control the gain of the amplifiers from the controller 41.

Figure 10:
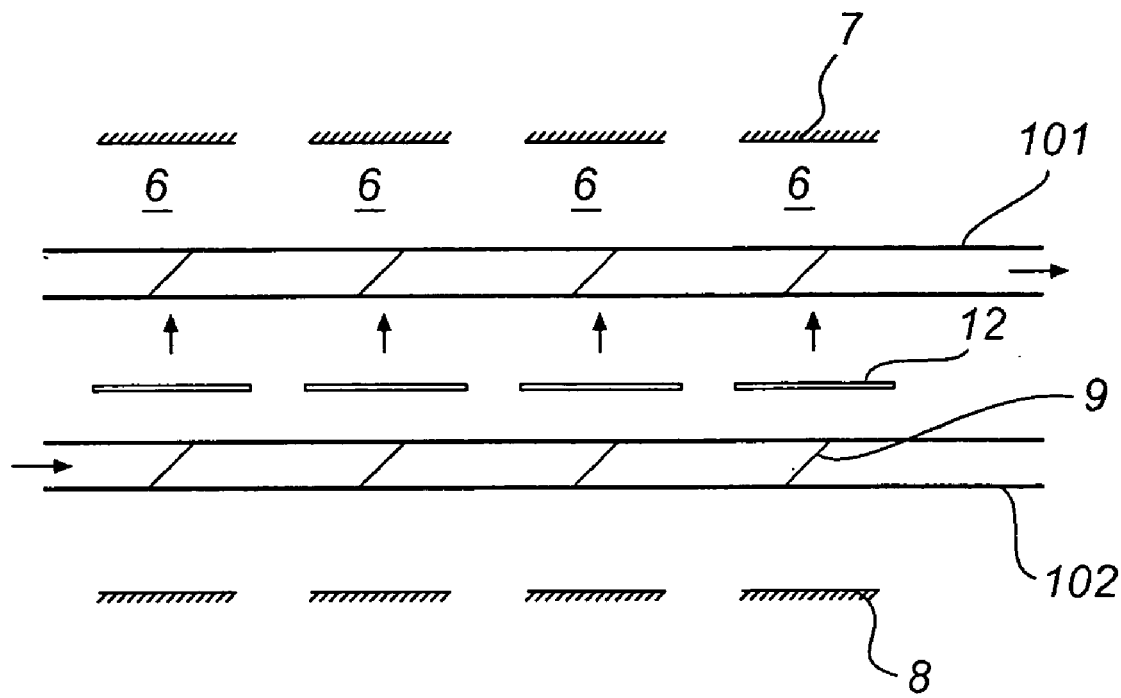
FIG. 10 schematically shows an arrangement according to the present invention comprising two fibres provided within external resonators.

FIG. 10 shows schematically yet another embodiment of an attenuating arrangement according to the present invention. In this case, two fibres 101, 102 are enclosed within external resonators 6. Rather than coupling the resonant channel back into the same fibre from the selection region, as is the case for the arrangement show in FIG. 1, the selected channel is coupled into a second intermediate fibre 101. Similar to the arrangement shown in FIG. 1, the arrangement of FIG. 10 can be provided with chirped Bragg gratings (not shown) in the intermediate fibres 101, 102 as well as with controllable absorbers 12 in the external resonators 6. An advantage of this embodiment is that the optical circulator can be eliminated by connecting an input fibre from the optical communications link to one of the intermediate fibres, and an output fibre to the other of the intermediate fibres.

Figure 11:
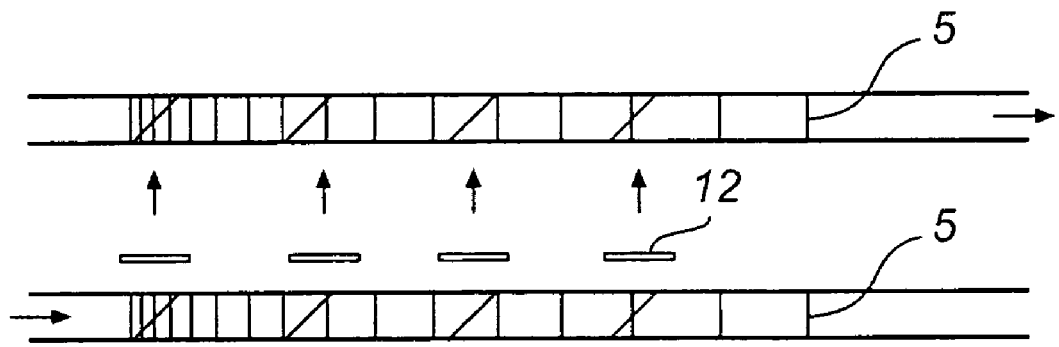
FIG. 11 schematically shows an arrangement according to the present invention comprising two fibres with internal resonators.

FIG. 11 shows schematically another embodiment of an attenuating arrangement according to the present invention. The embodiment shown in FIG. 11 is different from the one shown in FIG. 9 in that the external resonators are omitted. In this case, instead, internal resonators are utilised, which are constituted by a chirped Bragg grating 5 of strong index modulation in each fibre. Attenuation of an individual channel is easily achieved by introducing an absorber 12 between the two fibres. One channel is deflected from one fibre to the other by deflectors 9 superimposed on the chirped Bragg grating in the two fibres. Although the resolution of a filter according to the embodiment shown may not be as good as for the embodiment of FIG. 10, it may still be preferred by virtue of its simplicity.

Figure 12:
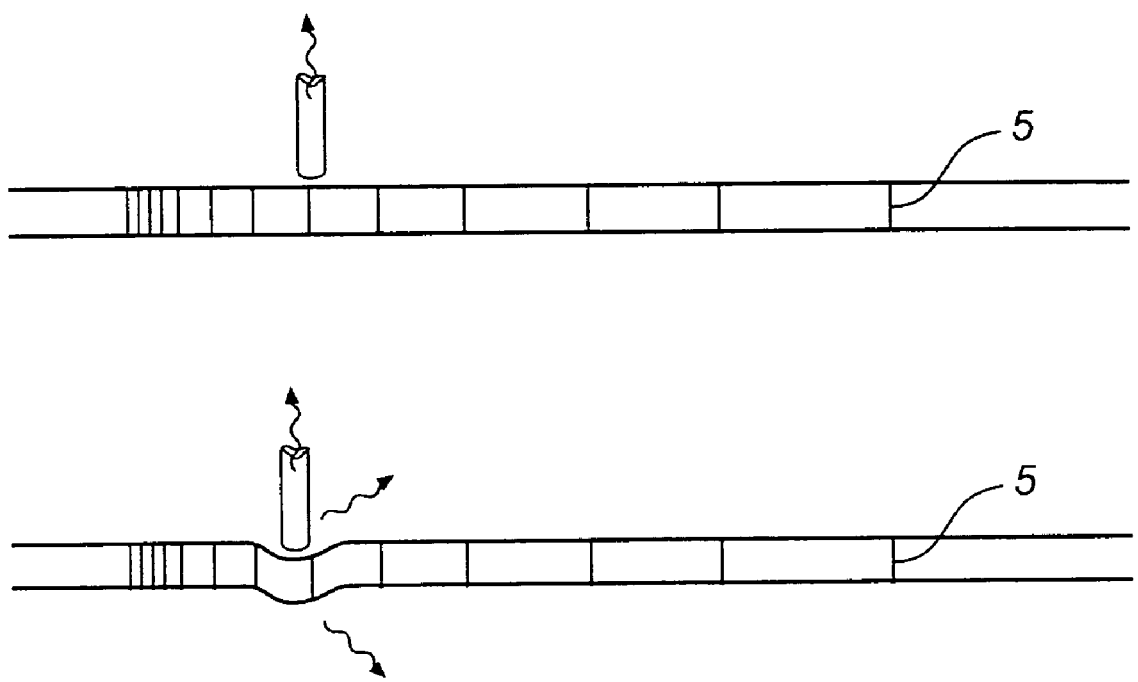
FIG. 12 schematically shows two embodiments of an arrangement according to the present invention comprising a single fibre with internal resonators.

FIG. 12 shows schematically an ingeniously simple embodiment of the present invention. In this case, a chirped grating 5 inside the fibre provides resonances to different wavelengths at different positions along the same. These resonances define a number of selection regions, in which the resonant wavelength has a substantially higher power density than other wavelengths. Wavelength specific (i.e. channel specific) attenuation is obtained by acting upon the fibre at the proper positions. For example, a loss can be introduced simply by pressing on the fibre at the appropriate position (at the position in which the chirped grating is resonant to the desired channel) and thus induce microbends that cause leaking of light out from the fibre, as shown in the lower picture of FIG. 12. By pressing on the fibre at a proper selection region, loss is predominantly introduced for the selected channel in that region (i.e. the channel that is resonant in said region).

Note that the power density of the resonant wavelength is increased in the selection region. This allows of a small enough loss to be used not to affect other wavelengths (other channels).

Alternatively, the loss can be introduced by moving a probe close to the waveguiding structure, thereby causing evanescent coupling of light out from the same, as shown in the upper picture of FIG. 12. The amount of light coupled out depends on the separation of the probe from the waveguiding structure. Preferably, if evanescent coupling is used for attenuating the optical signal, the cladding of fibre is partly removed in order to allow evanescent interaction with light in the core of the fibre.

It is to be understood that each resonator or resonant portion in the attenuating arrangement is, in fact, a dynamic optical coupler. The dynamic optical coupler can be utilised to remove a controlled amount or power from the resonant wavelength channel. For example, the dynamic optical coupler can be used as an add/drop device for adding and/or dropping a selected channel to or from a wavelength division multiplexed optical signal propagating in an optical fibre.

Optical fibres that are commonly used for communication purposes are usually not polarisation maintaining. Therefore, it is preferred, and in some cases essential, that the channel specific power control according to the present invention is performed on two orthogonal polarisation directions. It is preferred, for example, that the VWDM optical signal is separated into two orthogonal polarisation components and sent into a respective polarisation maintaining fibre, in which channel selective power control (or channel balancing) according to the present invention is performed on both components separately and in concert. Subsequently, the two components are recombined into the transport fibre (which is typically not polarisation maintaining) after having been subject to said power control.

The embodiments of the present invention that are described above and schematically shown in the drawings are not intended to limit the scope of the protection sought. On the contrary, any person skilled in the art will realise that a number of different embodiments, and modification of the embodiments shown and described, are conceivable within the scope of the invention. The scope of the invention is defined in the appended claims.

The invention claimed is:

1. A method for channel selective power control of a wavelength division multiplexed optical signal propagating in an optical fiber, the method including the steps of:
    selecting at least one channel within said optical signal having higher than a desired power level;
    establishing a resonance to the selected channel, the resonance providing a selection region where said selected channel has a substantially increased power density relative to channels out of resonance; and
    attenuating said selected channel a desired amount by adjusting the properties of said selection region, wherein the step of establishing a resonance comprises the sub-steps of:
    providing an external resonator, which is defined by a first and a second mirror, said first and said second mirror being provided outside and on opposite sides of the optical fiber; and
    deflecting light between the optical fiber and the external resonator, said deflecting being effected by a blazed phase grating provided in a core of said optical fiber.

2. The method as set forth in claim 1, in which the resonance to the selected channel is established by arranging one or several Bragg gratings inside the optical fiber, carrying the optical signal.

3. The method as set forth in claim 2, in which the resonance is established by arranging a chirped Bragg grating in the optical fiber, said grating being resonant to different wavelength channels at different portions along the same.

4. The method as set forth in claim 3, in which the selection region is comprised within the resonance, and attenuation is provided by introducing a loss in said selection region.

5. The method as set forth in claim 4, in which the selection region is made leaky by bending a selected portion of the optical fiber, light of predominantly the selected channel thereby being caused to leak out from the selection region.

6. The method as set forth in claim 4, in which the selection region is made leaky by moving a light guiding probe close enough to the optical fiber to allow evanescent coupling of light from the optical fiber into said probe.

7. The method as set forth in claim 1, further comprising the steps of:
    deflecting the selected channel from a first optical fiber carrying the optical signal into an external selection region; and
    coupling the selected channel from the selection region into a second optical fiber;
    the step of attenuating the selected channel being performed by absorbing light in said selection region.

8. The method as set forth in claim 7, in which the step of establishing a resonance comprises the step of providing at least one Bragg grating in each of the first and the second optical fibers.

9. The method as set forth in claim 8, in which at least one of the Bragg gratings is a chirped grating.

10. The method as set forth in claim 7, in which the step of establishing a resonance comprises the step of providing an external resonator enclosing both the first and the second optical fibers, said external resonator being defined by a first and a second mirror arranged outside and on opposite sides of the first and the second optical fibers.

11. The method as set forth in claim 7, in which the step of deflecting the selected channel from the first optical fiber is performed by means of a first blazed phase grating in the first optical fiber, and the step of coupling the selected channel into the second optical fiber is performed by means of a second blazed phase grating in the second structure optical fiber.

12. The method as set forth in claim 1, in which the step of attenuating is performed by changing the phase of the selected channel in the selection region relative to the phase of the selected channel in the optical fiber, thereby causing destructive interference on the selected channel.

13. The method as set forth in claim 12, in which the phase of the selected channel is changed by making a parallel displacement of the first and the second mirror with respect to the waveguiding structure optical fiber.

14. The method as set forth in claim 13, further comprising the step of altering the separation between the first and the second mirror.

15. The method as set forth in claim 12, in which the phase of the selected channel is changed by altering the refractive index in at least some portion of the external resonator, thereby altering the optical path length in the resonator.

16. The method as set forth in claim 1, in which the step of attenuating is performed by introducing a loss in the selection region.

17. The method as set forth in claim 16, in which the step of attenuating is performed by introducing an absorbing element in the selection region.

18. The method as set forth in claim 16, in which the step of attenuating is performed by making the selection region leaky, light thereby being caused to leak out of the same.

19. The method as set forth in claim 1, further comprising the step of tuning the external resonator to the wavelength of the selected channel.

20. The method as set forth in claim 19, in which the step of tuning the resonance is performed by adjusting the separation between the first and the second mirror.

21. The method as set forth in claim 19, in which the step of tuning the resonance is performed by tilting the external resonator with respect to the optical fiber.

22. The method as set forth in claim 19, in which the step of tuning the resonance is performed by:
adjusting the separation between the first and the second mirror; and
tilting the external resonator with respect to the optical fiber.

23. The method as set forth in claim 1, in which the step of selecting at least one channel having higher than a desired power level is performed by means of spectrum analysis of the wavelength division multiplexed optical signal.

24. The method as set forth in claim 1, in which the step of attenuating is performed by introducing an absorbing element inside the external resonator.

25. The method as set forth in claim 1, in which the deflector is provided within an internal resonator in the optical fiber, thereby enhancing the spectral selectivity of the channel selective power control.

26. An arrangement for channel selective power control of a wavelength division multiplexed optical signal propagating in an optical fiber, the arrangement comprising:
a spectrum analyser arranged to analyse the power spectrum of said optical signal and to identify and select at least one channel within said optical signal having higher than a desired power level;
an attenuator arranged to attenuate a selected channel within said optical signal;
a resonator arranged to provide a selection region where the selected channel has a substantially increased power density relative to channels out of resonance, said resonator being defined by a first and a second mirror which are provided outside and on opposite sides of the optical fiber; and
a deflector in the form of a blazed phase grating provided in a core of the optical fiber,
the attenuator further being arranged to attenuate said selected channel by changing the properties of said selection region.

27. The arrangement as set forth in claim 26, further comprising a controller, said controller being arranged to receive, from the spectrum analyser, information identifying the at least one channel having higher than a desired power level, and to control the attenuator to provide a desired level of attenuation to said at least one channel.

28. The arrangement as set forth in claim 27, wherein the spectrum analyser is operatively connected to the optical fiber upstream from the attenuator.

29. The arrangement as set forth in claim 28, wherein a second spectrum analyser is operatively connected to the optical fiber downstream from the attenuator, said second spectrum analyser also being operatively connected to the controller.

30. The arrangement as set forth in claim 27, wherein the spectrum analyser is operatively connected to the optical fiber downstream from the attenuator.

31. The arrangement as set forth in claim 26, comprising a plurality of attenuators and a plurality of resonators, said attenuators and said resonators being arranged to attenuate a plurality of wavelength channels within a wavelength division multiplexed optical signal.

32. The arrangement as set forth in claim 26, wherein the attenuator is arranged to introduce a loss in the selection region.

33. The arrangement as set forth in claim 26, wherein the attenuator is arranged to change the properties of the selection region in such a way that the phase of light being coupled back into the optical fiber from the external resonator is out of phase with light of the resonant wavelength propagating in the optical fiber, thereby causing attenuation by destructive interference.

34. The arrangement as set forth in claim 26, wherein a plurality of external resonators is coupled to a common channel of the WDM signal, said plurality of external resonators thereby constituting a set of sub-resonators associated with said channel.

35. The arrangement as set forth in claim 26, wherein the external resonator is adjustable in such way that the wavelength to which the external resonator is resonant can be tuned.

36. An optical device, comprising:
an optical fiber, capable of carrying an optical signal having a plurality of wavelength channels;
a resonator operatively connected to said waveguide, the resonator being resonant to at least one wavelength interval within said plurality of wavelength channels, said resonator establishing a region where the resonant wavelength interval has a substantially increased power density relative to wavelength intervals out of resonance; and
a controller arranged to adjust said resonator such that a controlled amount of power is removed from the resonant wavelength;
said resonator being defined by a first and a second mirror which are provided outside and on opposite sides of the optical fiber, and said optical fiber comprising a deflector in the form of a blazed phase grating in a core of the optical fiber, for deflecting light from the optical fiber into said resonator.

37. The device as set forth in claim 36, wherein the controller is operative to change the phase of light of the resonant wavelength in the resonator relative to the phase of light of the same wavelength in the optical fiber, fiber thereby causing destructive interference on said wavelength.

38. The device as set forth in claim 37, wherein the controller is operative to change the phase of light in the resonator by causing a change in the refractive index in at least some portion of the external resonator.

39. The device as set forth in claim 37, wherein the controller is operative to change the phase of light in the resonator by causing a parallel displacement of the external resonator with respect to the waveguide optical fiber.

40. The device as set forth in claim 36, wherein the controller is operative to provide absorption in the external resonator.

41. The device as set forth in claim 40, further comprising a controllable liquid crystal provided inside the external resonator, the controller being operative to provide absorption by changing the transmittance of said liquid crystal.

42. The device as set forth in claim 36, wherein the resonator is controllable such that the wavelength interval to which the resonator is resonant can be tuned, thereby allowing removal of power from different wavelength intervals at different instants.

\* \* \* \* \*